(12) United States Patent
Walton

(10) Patent No.: US 6,922,175 B2
(45) Date of Patent: Jul. 26, 2005

(54) RADIO TRANSMISSION REGION IN METALLIC PANEL

(75) Inventor: Eric K. Walton, Columbus, OH (US)

(73) Assignee: The Ohio State University, Columbus, OH (US)

( * ) Notice: Subject to any disclaimer, the term of this patent is extended or adjusted under 35 U.S.C. 154(b) by 207 days.

(21) Appl. No.: 10/310,670

(22) Filed: Dec. 4, 2002

(65) Prior Publication Data

US 2004/0113860 A1 Jun. 17, 2004

(51) Int. Cl.$^7$ ................................................ H01Q 1/32
(52) U.S. Cl. ..................... 343/713; 343/767; 52/786.11
(58) Field of Search ................... 343/767, 771, 343/895, 711, 713; 52/786.11, 786.12; 428/38, 46, 426

(56) References Cited

U.S. PATENT DOCUMENTS

| | | | |
|---|---|---|---|
| 3,975,738 A | 8/1976 | Pelton et al. ............... 343/872 |
| 4,287,520 A | 9/1981 | Van Vliet et al. ........... 343/909 |
| 4,813,198 A | 3/1989 | Johnston et al. .............. 52/171 |
| 5,012,255 A * | 4/1991 | Becker ........................ 343/704 |
| 5,139,850 A | 8/1992 | Clarke et al. ............... 428/192 |
| 5,147,694 A | 9/1992 | Clarke ......................... 428/34 |
| 5,620,799 A | 4/1997 | Sauer .......................... 428/426 |
| 5,853,889 A | 12/1998 | Joshi et al. ............... 428/416.1 |
| 5,867,129 A * | 2/1999 | Sauer .......................... 343/713 |
| 5,917,458 A | 6/1999 | Ho et al. ..................... 343/909 |
| 6,081,237 A * | 6/2000 | Sato et al. ................... 343/713 |
| 6,356,236 B1 | 3/2002 | Maeuser et al. ............. 343/713 |
| 6,377,221 B1 | 4/2002 | Lindenmeier et al. ....... 343/713 |
| 6,452,560 B2 | 9/2002 | Kunysz ....................... 343/770 |
| 6,551,715 B1 | 4/2003 | Seto et al. ................... 428/411 |
| 2002/0122009 A1 * | 9/2002 | Winebrand et al. ......... 343/767 |
| 2003/0112190 A1 * | 6/2003 | Baliarda et al. ............. 343/713 |

* cited by examiner

*Primary Examiner*—Tho Phan
(74) *Attorney, Agent, or Firm*—Standley Law Group LLP

(57) ABSTRACT

A region in a metallic panel that facilitates the transmission of radio frequency signals. The metallic panel may be included in a window such as the window of a vehicle or building. For example, the metallic panel may be used for heating or to reflect infrared radiation. An aperture is formed in the metallic panel to enable radio frequency signals to be transmitted through the metallic panel. The design of the aperture may be selected to enable the transmission of the desired frequency band. In an embodiment in which the metallic panel is used to conduct electric current, the aperture may be oriented such that the current may flow between the openings of the aperture. Accordingly, there may be uniform heating across the metallic panel without blocking the transmission of radio frequency signals in the desired frequency band.

25 Claims, 14 Drawing Sheets

RADIO TRANSMISSION REGION IN METALLIC PANEL

BACKGROUND AND SUMMARY OF THE INVENTION

The present invention relates generally to radio frequency (RF) communication. More particularly, the present invention relates to a metallic panel that is adapted to enable radio frequency communication.

Metallic panels are used in a wide variety of applications. In fact, transparent, metallic panels are even used in windows of buildings and vehicles. Transparent, metallic panels may be used in building and vehicle windows in order to reflect infrared radiation, thereby limiting heat build up in the interior. Additionally, transparent, metallic panels may be used in vehicle windows in order to enable a flow of electric current across the window. In such embodiments, the flow of electricity is adapted to defrost (i.e., melt ice and snow) or defog the window.

Despite the many benefits, there is a significant drawback of using metallic panels in windows and other applications. Metallic panels can block the transmission of RF signals. As a result, the use of metallic panels in windows can limit or prevent the transmission of RF signals into and out of buildings, vehicles, and other similar structures.

Modern communication is heavily dependent on the transmission of RF signals. For instance, AM/FM radios, CB radios, cellular phones, global positioning systems, automatic toll collection transponders, radar systems, and various other satellite systems operate using RF communication. Accordingly, there is a need for a metallic panel that is adapted to permit the transmission of RF signals. There is also a need for a window that includes a metallic panel that facilitates RF transmission. Furthermore, there is a need for facilitating RF transmission through a panel while also enabling electric current flow across the panel without creating localized high current or low current regions.

SUMMARY OF THE INVENTION

The present invention includes panels and windows having regions that facilitate radio frequency transmission. The panels and windows of the present invention may be useful in a variety applications. For example, the panels and windows of the present invention may be implemented in vehicles, buildings, and in other structures that utilize panels or windows.

In one embodiment of the present invention, a window comprises a sheet of dielectric material and a metal layer. At least a portion of the metal layer traverses at least a portion of the dielectric material. An aperture is formed in the metal layer to facilitate RF transmission. The aperture is comprised of at least one opening. In an example of the aperture having multiple openings, the openings may be approximately parallel to each other.

The window may be for any suitable structure including, but not limited to, a vehicle or a building. An example of the dielectric material is glass or plastic. The dielectric material may be comprised of at least one layer. In an embodiment in which the dielectric material is comprised of a plurality of layers, the metal layer may be secured between the layers of the dielectric material. For one example, the metal layer may be vacuum deposited (e.g., sputtered) on the dielectric material (e.g., in between layers of the dielectric material).

The aperture may have any suitable shape and may be arranged in any suitable pattern for facilitating RF transmission. For instance, the openings of the aperture may be slots. In one embodiment, the respective lengths of the openings generally increase from one side of the aperture to an opposite side of the aperture. Such an embodiment may be useful to take into account any curvature of the metallic panel. In one embodiment designed to facilitate the transmission of horizontally polarized RF signals, the openings may be approximately vertically oriented. In another embodiment that enables the transmission of vertically polarized RF signals, the openings may be approximately horizontally oriented. Furthermore, the present invention includes multiple embodiments that are adapted to facilitate the transmission of both vertically polarized and horizontally polarized RF signals. For example, the openings of the aperture may be zigzags. In one variation, at least one of the zigzags may be broken (i.e., at least one of the zigzags may be comprised of a plurality of openings that are separated by the metallic panel). In yet another variation, a plurality of fill-in openings may be included along opposing edges of the zigzags.

Another embodiment of the present invention is a panel. The panel is comprised of a metal layer that is adapted to conduct electricity. An aperture is defined in the metal layer. The aperture may be comprised of at least one opening. In an embodiment in which the aperture is comprised of a plurality of openings, the openings may be approximately parallel to each other. In such an embodiment, the aperture may be oriented such that electricity is adapted to pass between the openings from one portion of the metal layer to another portion of the metal layer (e.g., from top edge to bottom edge or from side edge to side edge). Moreover, the aperture is adapted to enable the transmission of a radio frequency signal through the metal layer. It should also be recognized that this embodiment of the panel may include any of the optional or preferred features of the panel of the previously described embodiment of the present invention.

In another embodiment of the present invention, a window is comprised of a metal layer that traverses all or a portion of a sheet of glass. A bus is in electrical communication with a power source and the metal layer. Another bus is also in electrical communication with the metal layer. An aperture is defined in the metal layer. The aperture may be comprised of at least one opening. For instance, an aperture may be comprised of an array of openings. In one example, the aperture is oriented such that electricity is adapted to pass between the openings from the first bus to the second bus. The aperture is also adapted to enable the transmission of a radio frequency signal through the metal layer. Furthermore, this embodiment of the window may include any of the optional or preferred features of the previously described embodiments of the present invention.

In addition to the novel features and advantages mentioned above, other features and advantages of the present invention will be readily apparent from the following descriptions of the drawings and exemplary embodiments.

DETAILED DESCRIPTION OF EXEMPLARY EMBODIMENT(S)

The present invention generally relates to a region in a metallic or non-metallic panel that facilitates the transmission of RF signals. The present invention may be utilized in any environment where metallic panels (or other non-metallic types of panels that block RF signals) are implemented. For example, the present invention may be implemented in windows having a transparent, metallic layer including, but not limited to, vehicle windows, building windows, and other types of windows. However, the present invention is not limited to uses with transparent or translucent panels. In other words, the present invention may also be implemented in opaque panels.

The present invention is primarily described herein with regard to facilitating the transmission of RF signals because many modern devices use RF communication. For example, some embodiments of the present invention may be useful for some or all of the following frequency bands: (1) the cellular AMPS band (800–900 MHz); (2) the cellular digital (PCS) band (1750–1850 MHz); and (3) the GPS navigation band (1574 MHz). Nevertheless, it should be recognized that the present invention may also be useful for enabling the transmission of frequencies outside (i.e., above or below) these example RF bands. Accordingly, the present invention is not limited to certain apertures that facilitate the transmission of specific RF signals.

Figure 1:
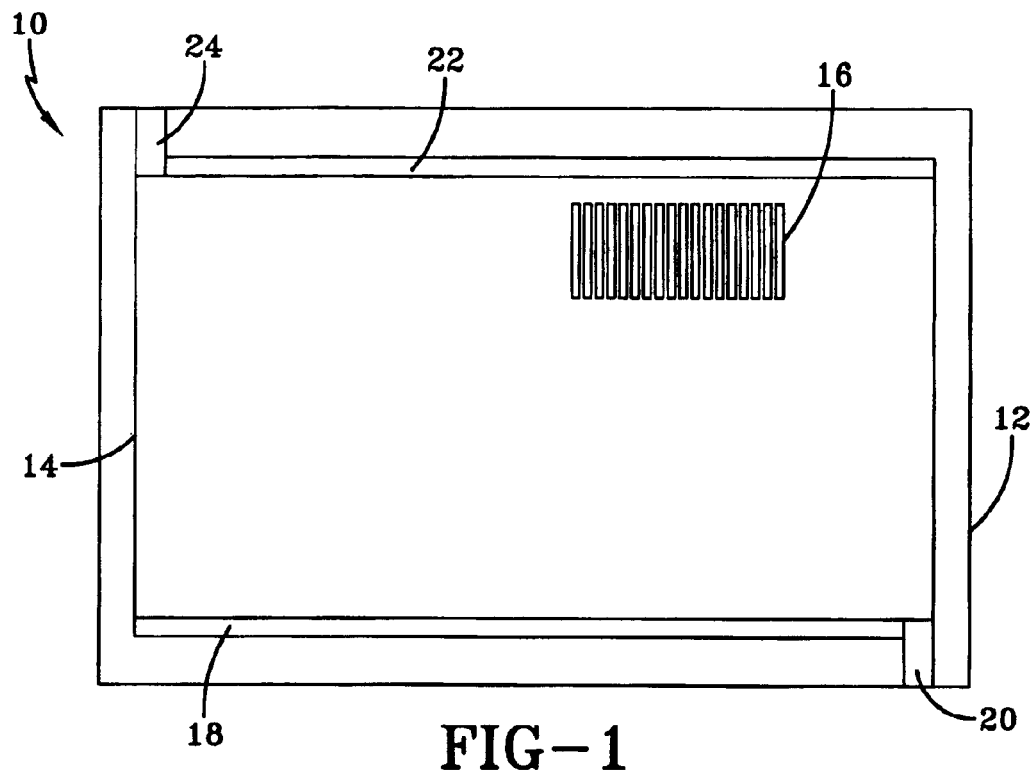
FIG. 1 is a diagram of one embodiment of a window of the present invention in which an electrically heated metal film panel has a vertical slot transmission zone.

FIG. 1 shows an example of one embodiment of the present invention. In FIG. 1, the window 10 is comprised of a sheet of dielectric material 12 and a metal layer 14. The metal layer 14 may traverse all or a portion of the dielectric material 12. The metal layer 14 may serve as a shield against RF signals. However, an aperture 16 is defined in the metal layer 14 to facilitate the transmission of RF signals through the metal layer 14.

The window 10 may be any desired type of window including, but not limited to, a vehicle window, a building window, or any other type of window. The dielectric material 12 of the window 10 may be any material having desired dielectric characteristics. For example, the dielectric material 12 may be glass, plastic, or any other similar, suitable, or conventional dielectric material. An example of glass includes, but is not limited to, safety glass. Examples of plastic include, but are not limited to, plexiglass and polycarbonate.

The dielectric material 12 may be comprised of a single layer or multiple layers. The metal layer 14 may be secured to an outer surface or in between layers of the dielectric material 12. The metal layer 14 may be formed using any suitable manufacturing technique including, but not limited to, vacuum deposition (including, but not limited to, sputtering), extrusion, or any other similar technique. For example, the metal layer 14 may be vacuum deposited (e.g., sputtered) on an outer surface or in between layers of the dielectric material 12.

As used herein, an aperture shall be understood to be comprised of at least one opening. In the example of FIG. 1, the aperture 16 is comprised of an array of openings. More particularly, the openings of the aperture 16 are slots in this example. In a variation of this embodiment, the openings may be interconnected such that there is actually one continuous opening.

The aperture 16 may be formed in the metal layer 14 using any suitable manufacturing technique. For instance, the metal layer 14 may be formed and then portions of the metal layer 14 may be removed to create the aperture 16. For another example, the metal layer 14 and the aperture 16 may be simultaneously formed (i.e., no portions of the metal layer 14 are removed to form the aperture 16).

In the example of FIG. 1, the aperture 16 is comprised of slots that are approximately vertically oriented. In addition, the slots of the aperture 16 are approximately parallel to each other in this embodiment. Consequently, this particular embodiment is useful for facilitating the transmission of horizontally polarized signals.

The embodiment of FIG. 1 offers another significant benefit. The metal layer 14 of this example is adapted to conduct electricity. A bus 18 is in electrical communication with a power source via a lead 20. Another bus 22 is in electrical communication with a common or ground line 24. Electric current is adapted to flow across the metal layer 14 between the buses 18 and 22. The aperture 16 is oriented in the direction of current flow. As a result, the current may flow between adjacent openings of the aperture 16 from bus 18 to bus 22 as opposed to flowing around the aperture 16. This enables the heating to remain approximately uniform over the window 10. In other words, there is not a "cool spot" at the location of the aperture 16 when the rest of the window 10 is being heated. Moreover, since current is enabled to pass between adjacent openings of the aperture 16, this embodiment may substantially limit or prevent hot spots that may otherwise be caused by excessive current flow around the corners and edges of the aperture. Nevertheless, it should be recognized that the aperture may be oriented in some embodiments of the present invention such that current may not flow between adjacent openings of the aperture.

The aperture of FIG. 1 is merely one example of a suitable aperture of the present invention. Although the openings of the aperture 16 of FIG. 1 are approximately parallel, it should be recognized that the spacing between adjacent openings may be varied such that adjacent openings are not parallel. In fact, it should be recognized that the openings of the aperture 16 may have any suitable size and shape (not limited to slots), may be of any suitable number, and may be arranged in any suitable pattern and orientation to facilitate the transmission of signals in the desired frequency range. In an exemplary embodiment, the design of the aperture may be based on the theory of frequency selective surfaces (FSS). Utilizing the theory of frequency selective surfaces, the length, width, shape, orientation, and spacing of the opening(s) of the aperture may be selected to enable transmission of signals in the desired frequency bands.

Figure 2:
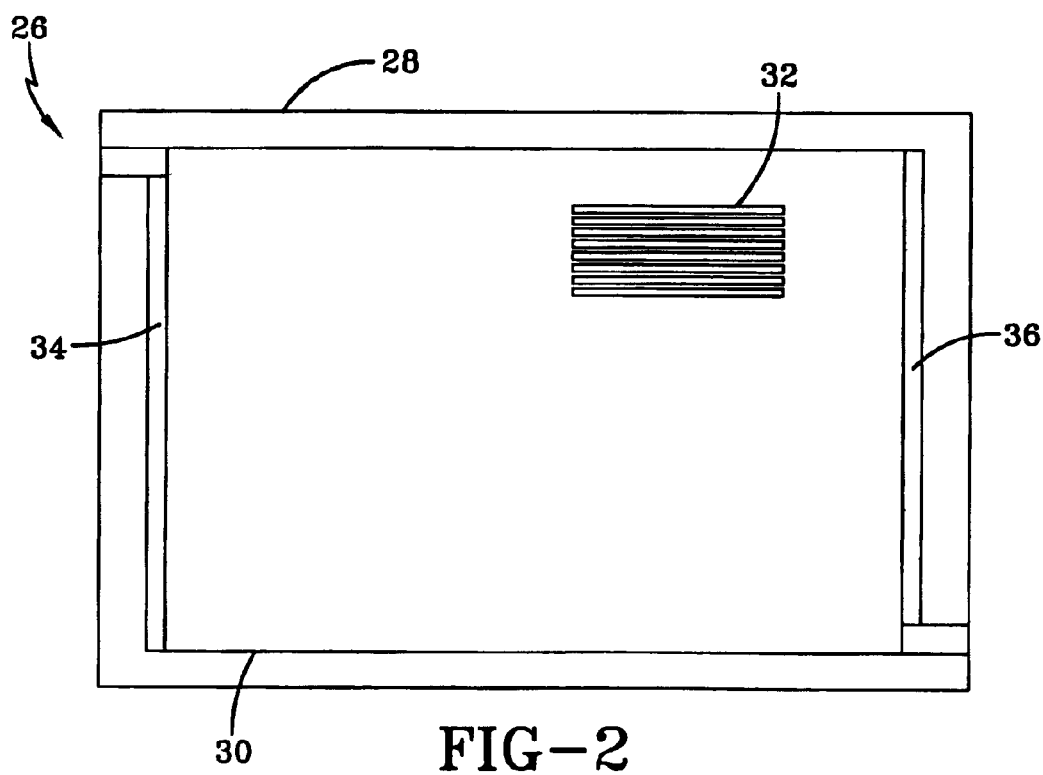
FIG. 2 is a diagram of one embodiment of a window of the present invention in which an electrically heated metal film panel has a horizontal slot transmission zone.

FIG. 2 illustrates another embodiment of the present invention. In this example, the window 26 is comprised of a dielectric material 28 and a metal layer 30. The aperture 32 is approximately horizontally oriented between bus 34 and bus 36. Consequently, current is adapted to flow between adjacent openings of the aperture 32 from bus 34 to bus 36.

Figure 3:
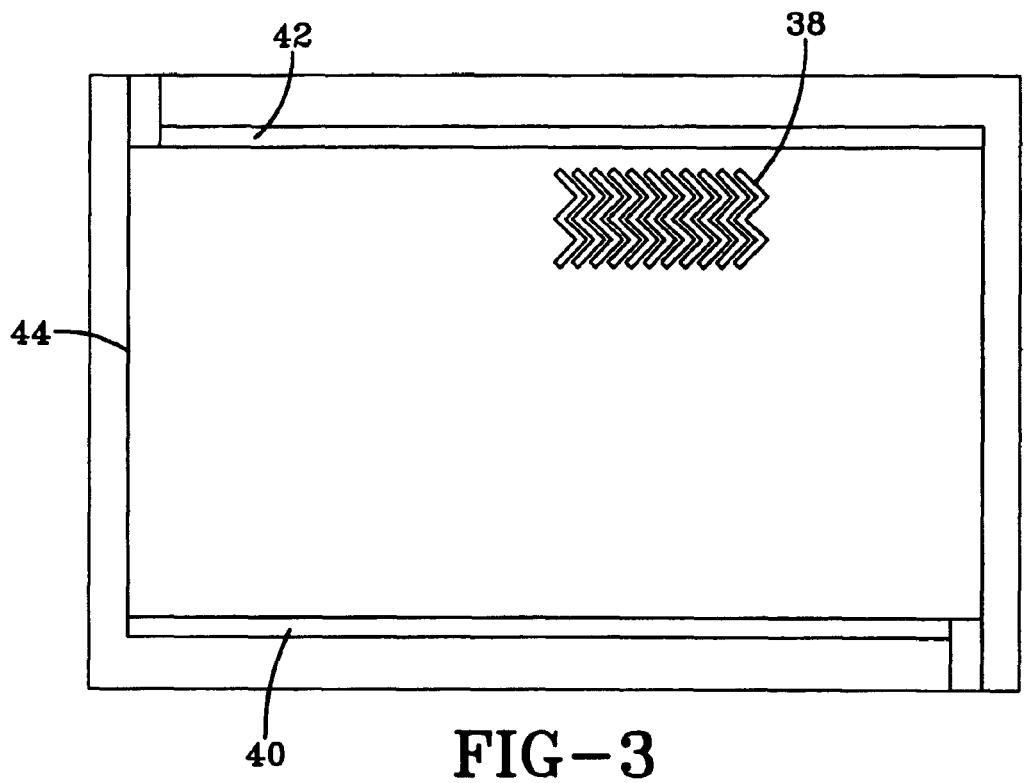
FIG. 3 is a diagram of one embodiment of a window of the present invention in which an electrically heated metal film panel has a polarization-controlled transmission region.

FIG. 3 shows another example of a FSS region. In this example, the FSS region 38 is an aperture having zigzag openings that enables full polarization performance of the system. In other words, the aperture facilitates the transmission of both vertically polarized and horizontally polarized signals and thus all other polarizations as linear combinations. In addition, the openings of the FSS region 38 are oriented in the direction of current flow between bus 40 and bus 42, thereby enabling substantially uniform heating over the area of the metal layer 44.

Among other factors as previously noted, the angle of the tilt of the zigzags and the length of the legs have an impact on the polarization and frequency band performance of the FSS region 38. In the example of FIG. 3, the +45 degree tilt polarization electric field component propagates through the −45 degree tilt portion of the pattern, and the −45 degree tilt polarization electric field component propagates through the +45 degree tilt portion of the pattern. Nevertheless, it should be recognized that factors such as the tilt angle, the length of the legs, and the number of direction changes may be varied in order to obtain the desired transmission characteristics of the FSS region 38.

Figure 4:
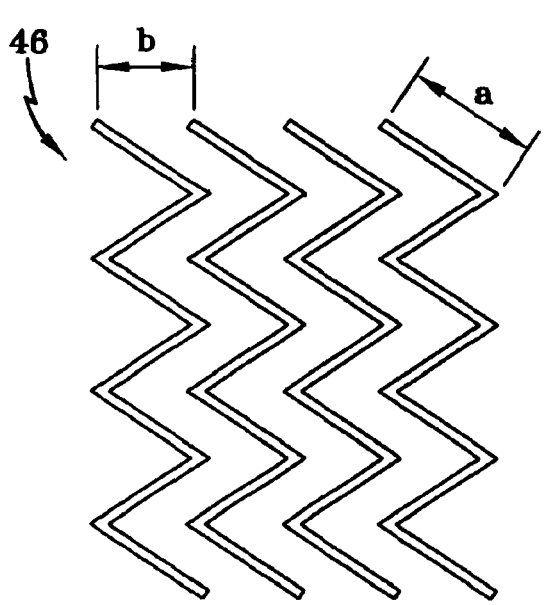
FIG. 4 is a diagram of one embodiment of an aperture of the present invention having zigzag openings.

FIG. 4 illustrates another example of an aperture having zigzag openings. Each leg of the pattern 46 has a length a. The spacing between adjacent openings is b.

Figure 5:
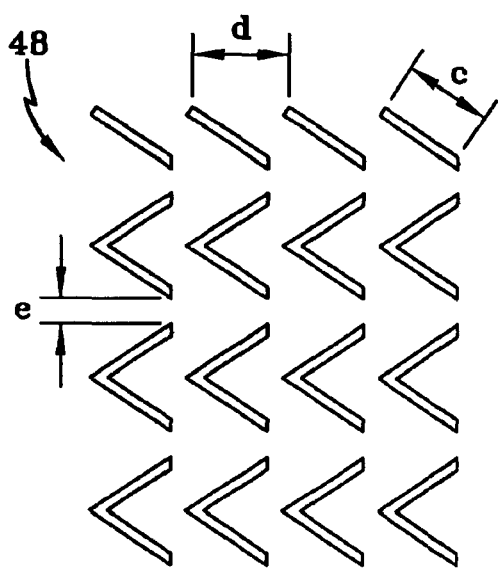
FIG. 5 is a diagram of one embodiment of an aperture of the present invention having a broken pattern of openings.

One embodiment of a broken pattern of openings is shown in FIG. 5. A leg of the pattern 48 has a length c, and adjacent zigzags are separated by a distance d. The pattern is considered broken because there is a gap e between some of the legs. Breaking an opening may be useful to adjust the transmission characteristics over a desired frequency band. Furthermore, breaking an opening may be useful to improve the current flow characteristics. FIG. 5 is merely one example of an aperture having a broken pattern of openings. A broken pattern of openings includes a pattern in which there is at least one gap between adjacent legs of at least one of the zigzags of the aperture, i.e., a discontinuous zigzag. It should also be recognized that any other type of aperture (including, but not limited to, the apertures of FIGS. 1, 2, and 3) may be given a broken pattern by inserting a gap at any point in an opening.

Figure 6:
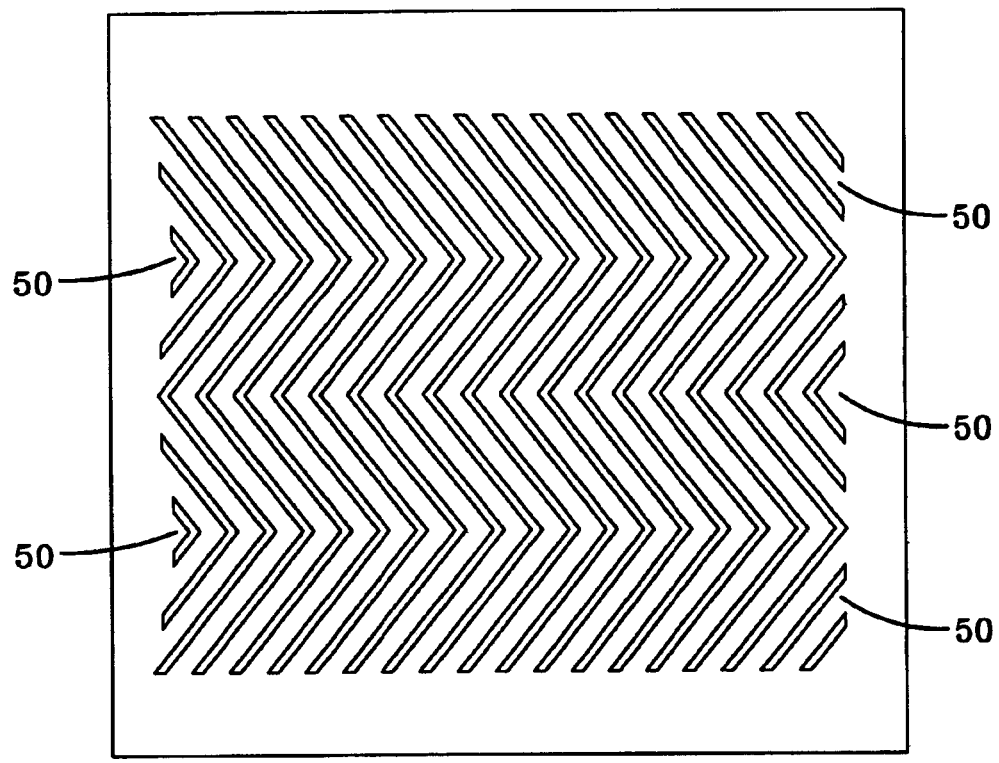
FIG. 6 is a diagram of one embodiment of an aperture of the present invention that includes a plurality of fill-in openings along opposing edges of the zigzags.

FIG. 6 illustrates an example of an aperture that utilizes fill-in or make-up openings along the edges of the aperture. In this embodiment, fill-in openings 50 are used along opposing edges of the zigzags, thereby giving the aperture generally smooth edges. Some or all of the openings 50 may be useful to lessen any non-uniformity in the current flow caused by the corners of the pattern. In particular, the fill-in openings 50 may be adapted to direct the heating current into the inside corner spaces. Such an embodiment helps to fill in the heater current to provide enhanced uniform heating across the overall aperture pattern.

Figure 7:
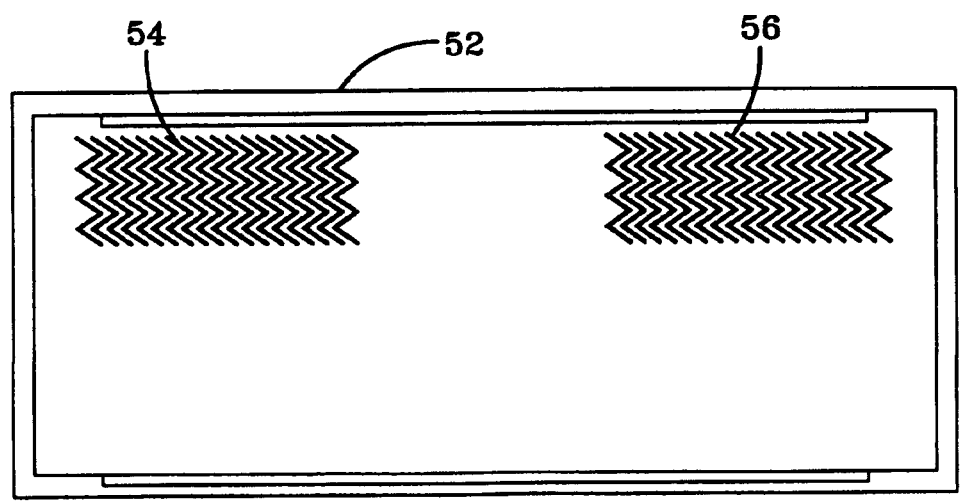
FIG. 7 is a diagram of one embodiment of a window of the present invention that includes a plurality of transmission regions.

It should be recognized that there may be multiple apertures in a single metallic layer. FIG. 7 shows an example of a window 52 that has an aperture 54 and an aperture 56. Multiple apertures may be useful to improve the transmission characteristics of the window 52.

Figure 8:
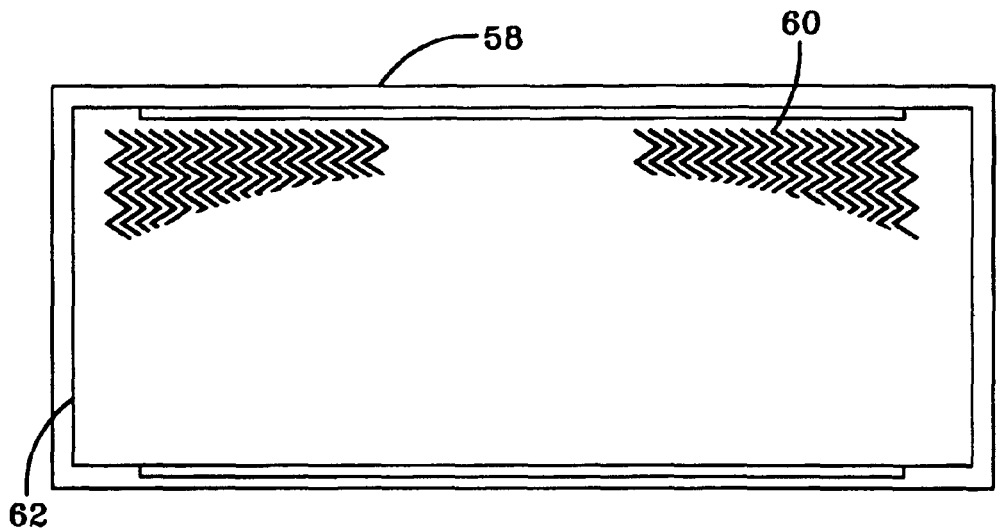
FIG. 8 is a diagram of one embodiment of a window of the present invention in which the lengths of the openings of the aperture generally change from one edge to another edge of the aperture.

FIG. 8 illustrates another window 58 that has multiple FSS regions. With reference to aperture 60 in this embodiment, the respective lengths of the individual openings generally increase from one side of the aperture to an opposite side of the aperture. This embodiment may be useful to account for any curvature of the window 58. More particularly, the total electrical resistance of the metal layer 62 may be made approximately uniform by varying the respective lengths of the openings to control resistance. In effect, the longer openings force the electrical current to flow in a longer path, thereby correcting for any curvature of the window 58.

When a radio signal passes through an aperture in a metal layer, sidelobes may occur in the transmitted signal. In the case of a vehicle windshield, the lobes would be inside the passenger compartment of the vehicle. Consequently, the user of a handheld wireless device, e.g., a cellular phone, may find that changes in the position of the handheld device may cause changes in the signal strength.

The potential effect of sidelobes may be taken into consideration when designing an aperture. The far field pattern of an aperture is the Fourier transform of the signal distribution over the aperture. Consequently, standard Fourier windowing techniques may be used to suppress sidelobe patterns in the transmitted signal. Examples of Fourier windowing techniques are those that may use a taper in the transmission amplitude and/or the phase to suppress lobing effects on the other side of an aperture.

Figure 9:
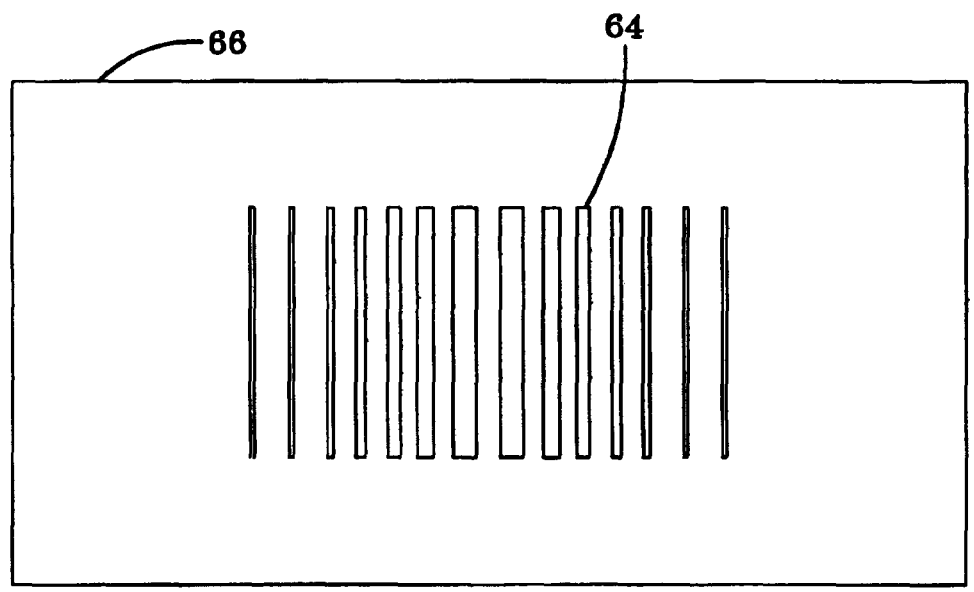
FIG. 9 is a diagram of one embodiment of a tapered aperture of the present invention.

FIG. 9 illustrates one example of a tapered aperture. In this embodiment, an aperture 64 is shown in a panel 66. The spacing, shape, and size of the openings vary across the aperture to control the RF transmission coefficient across the aperture 64. In this particular example, the openings get gradually wider toward the center of the aperture, and the spacing between the openings is generally more narrow toward the center of the aperture. However, it should be recognized that there are numerous ways to taper the transmission coefficient based on combinations of the shape, size, and location of the openings of the aperture. For example, the spacing between the openings may be about the same, and the width of the openings may be varied to control the amount of tapering. For another example, the width of the openings may be about the same, and the spacing between the openings may be varied to control the amount of tapering. It should also be recognized that the taper in the transmission coefficient may be over any desired range. In an exemplary embodiment, the relative transmission coefficient is preferably at least 90%, more preferably at least 95%, still more preferably about 100%, near the center of the aperture and less than about 40%, more preferably less than about 30%, still more preferably less than about 20%, at an edge of an aperture. As used herein, the term relative transmission coefficient refers to the ratio of the transmission coefficient through the aperture relative to what the transmission coefficient would be if there was no metallic panel to limit transmission (i.e., a nominal or baseline value). In one exemplary embodiment of the present invention, there is a taper in the transmission coefficient such that the relative transmission coefficient is nearly 100% near the center of an aperture and approaches 0% at the edge. Furthermore, it should be recognized that the tapering may occur over any desired portion(s) of an aperture. In one exemplary embodiment, the tapering occurs over at least 10%, more preferably over at least 20%, still more preferably over at least 30%, even more preferably over at least 40%, of an edge portion of an aperture relative to the distance to the center of the aperture. Nevertheless, it should be recognized that less tapering over an edge portion of an aperture may be desired for certain applications.

EXAMPLES

Multiple embodiments of the present invention have been tested. In summary, the testing shows that the theory of frequency selective surfaces as well as Fourier windowing techniques may be used to improve the transmission characteristics of an aperture of the present invention. With regard to FIGS. 10 through 17, test results are provided for both orthogonal (vertical) and parallel (horizontal) polarizations in the 500 MHz to 18 GHz frequency band. The results are based on simulations using a periodic moment method (PMM) computer calculation code. All data in these figures is normalized with respect to free space. In an actual window, there may be extra loss due to the glass which is not shown in these test results. Typically, a clear section of glass (e.g., about 5.4 mm thick) may cause about 2 to 3 dB of loss as compared to free space.

Figure 10:
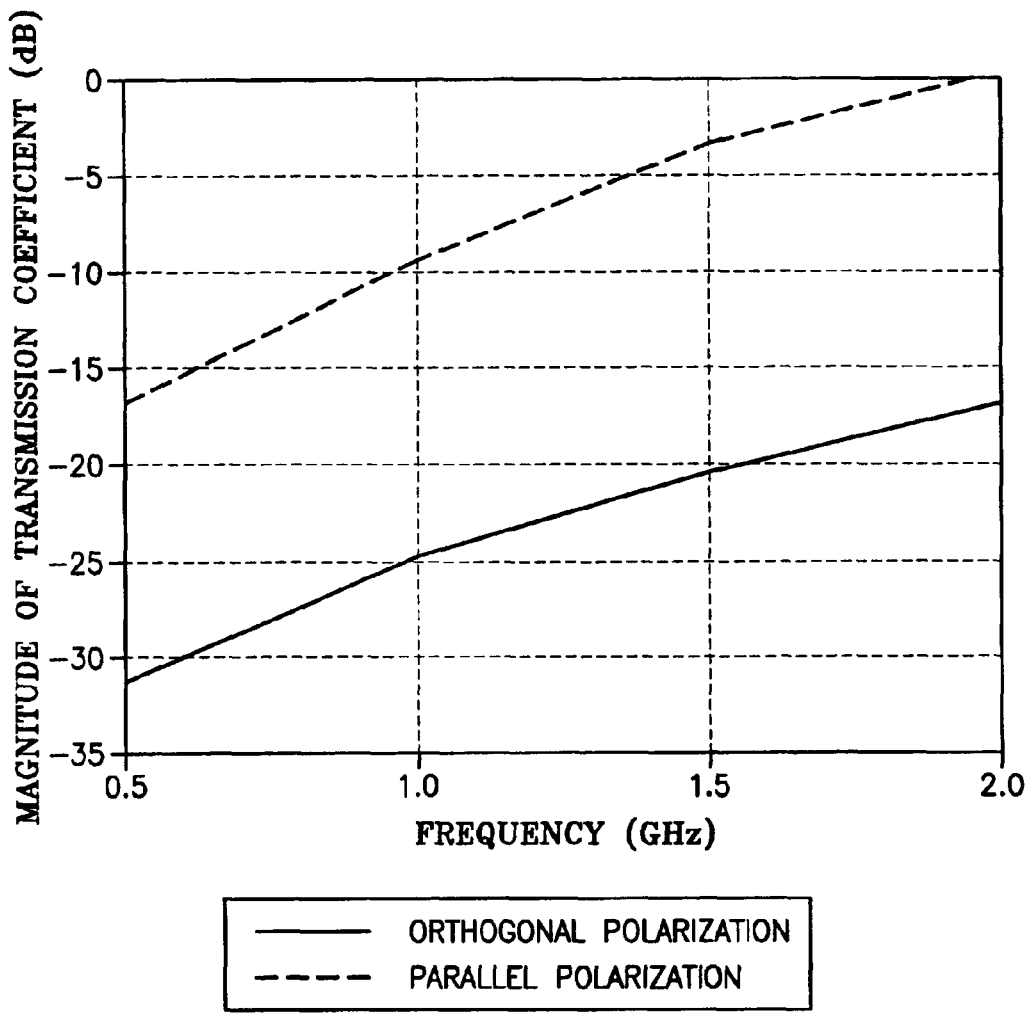
FIG. 10 is a plot of the transmission properties of an exemplary transmission region of the present invention over the 0.5 to 2 GHz frequency band.
Figure 11:
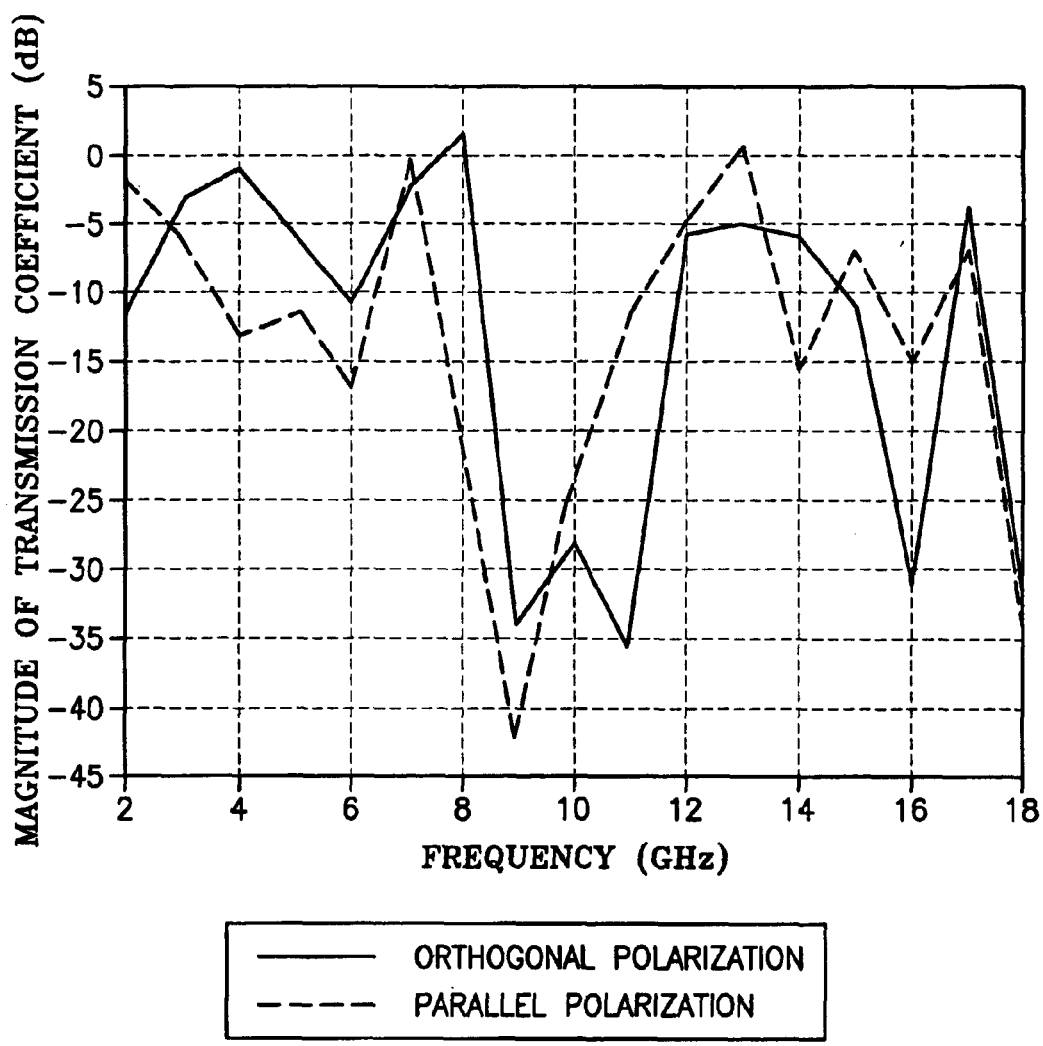
FIG. 11 is a plot of the transmission properties of an exemplary transmission region of the present invention over the 2 to 18 GHz frequency band.

FIGS. 10 and 11 illustrate the transmission properties of one embodiment of an aperture of the present invention having broken, zigzag openings. In particular, the tested embodiment was similar to the aperture of FIG. 5, wherein: the length c was about 41.4 mm; the spacing d was about 2 mm; the gap e was about 1 mm; and the angle between the opening segments, i.e., legs, was about 90 degrees. From FIG. 10, it can be seen that this design offers superior performance for horizontally polarized signals in the 0.5 to 2 GHz band. FIG. 11 shows a null around 10 GHz, but there are also frequency regions where the transmission coefficient is about 5 dB. Using the design principles of the present invention, the frequency at which the null occurs may be shifted by varying the size c of the legs.

Figure 12:
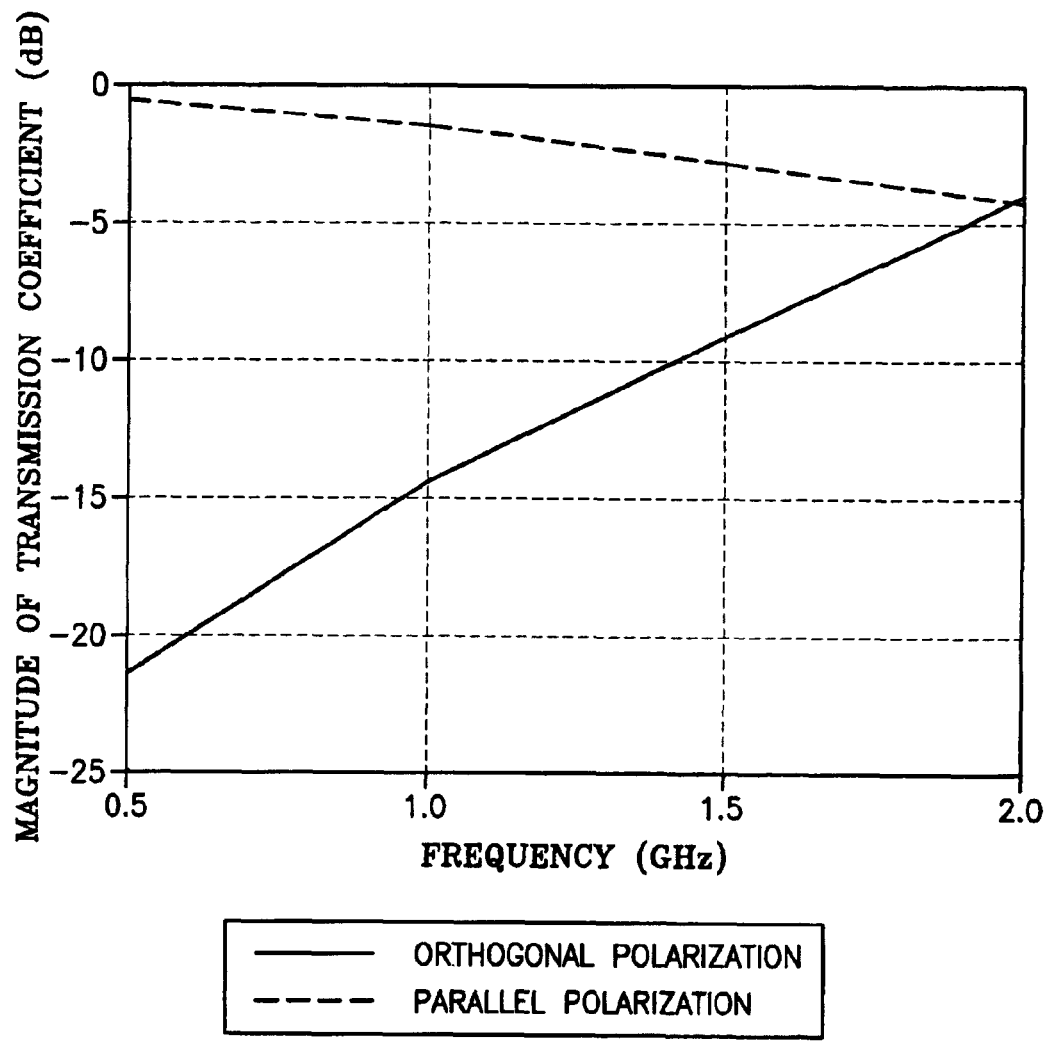
FIG. 12 is a plot of the transmission properties of an exemplary transmission region of the present invention over the 0.5 to 2 GHz frequency band.
Figure 13:
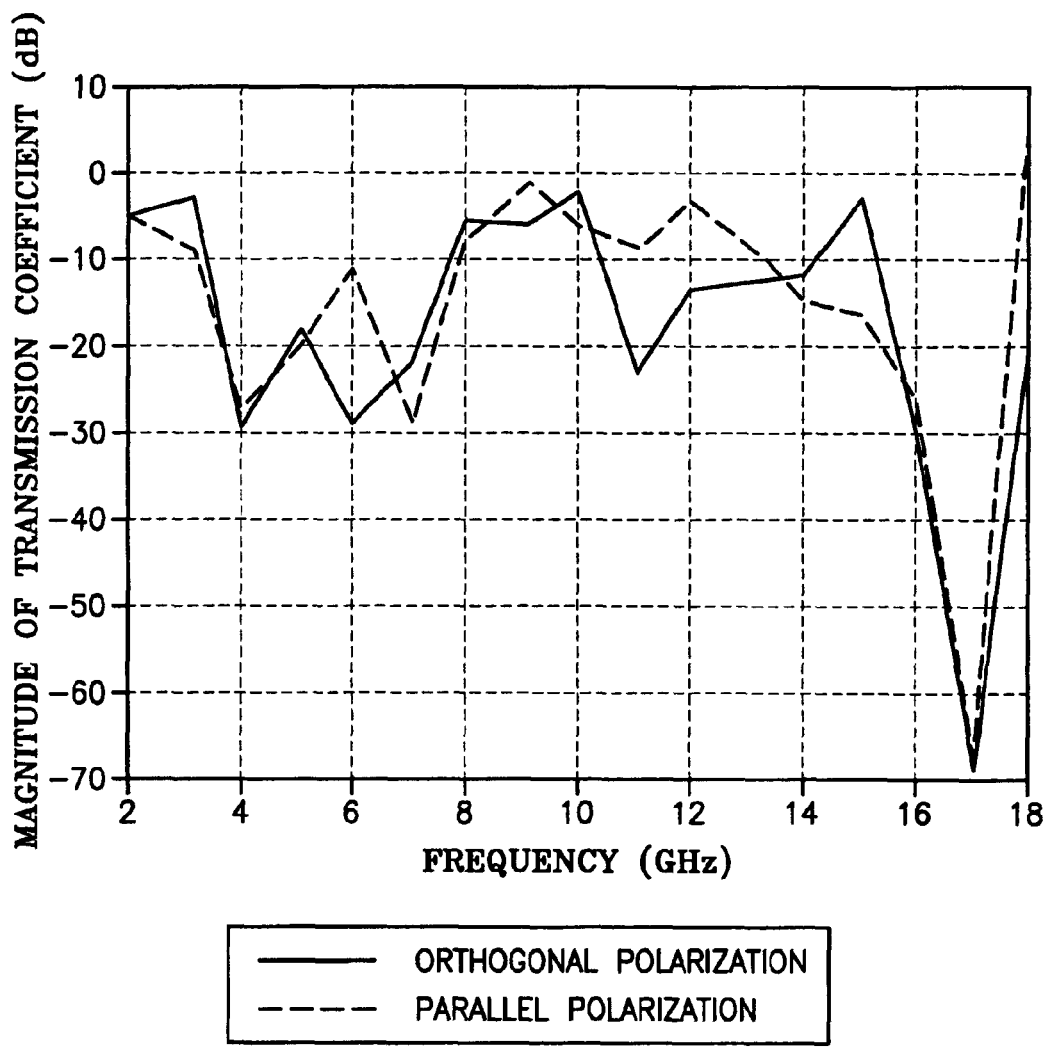
FIG. 13 is a plot of the transmission properties of an exemplary transmission region of the present invention over the 2 to 18 GHz frequency band.

FIGS. 12 and 13 show the test results for an embodiment similar to the aperture of FIG. 4. In this particular example, the length a was about 41.4 mm, the spacing b was about 2 mm, and the angle between the opening segments, i.e., legs, was about 90 degrees. Over the 0.5 GHz to 2 GHz frequency band, this embodiment provides a better transmission coefficient for horizontally polarized signals. In addition, this aperture shows good transmission properties around 10 GHz for both horizontally and vertically polarized signals.

Figure 14:
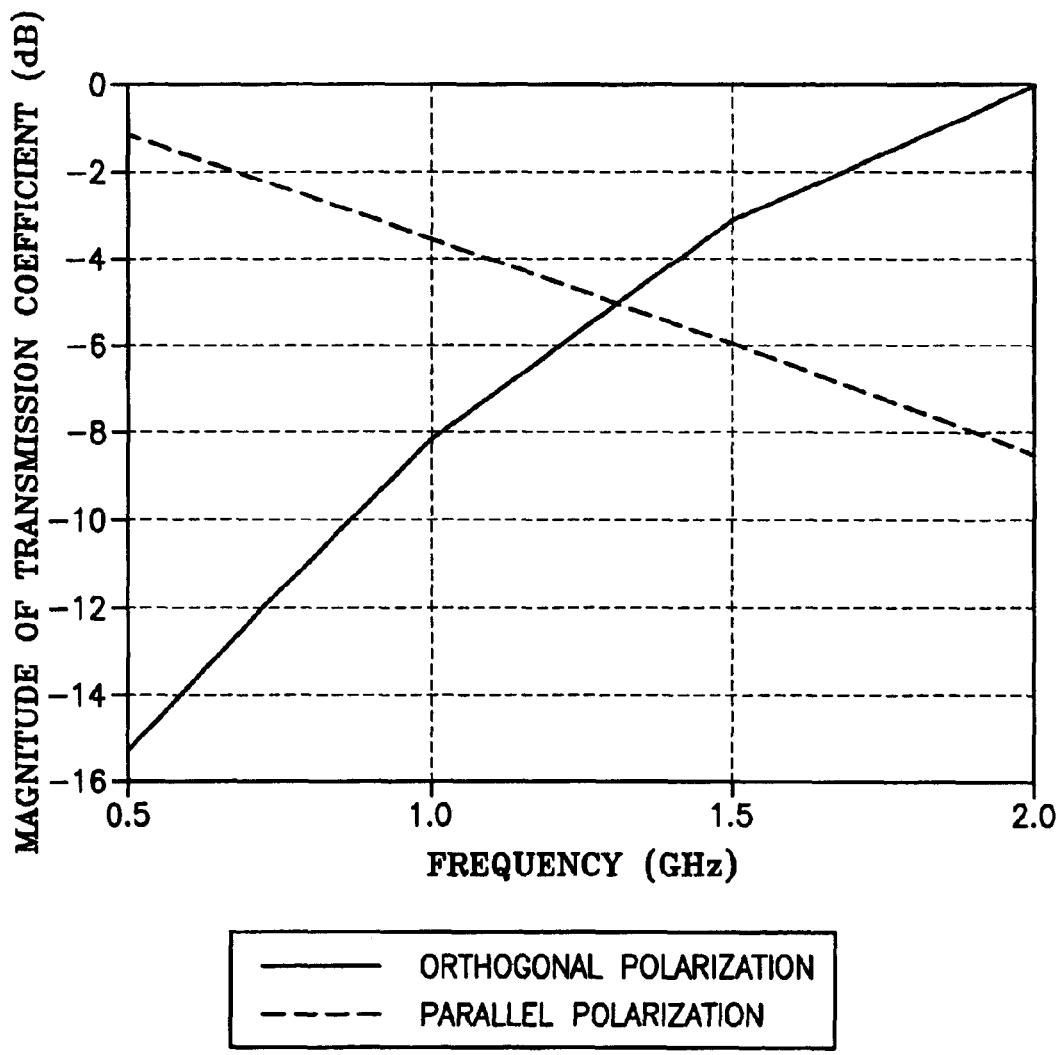
FIG. 14 is a plot of the transmission properties of an exemplary transmission region of the present invention over the 0.5 to 2 GHz frequency band.
Figure 15:
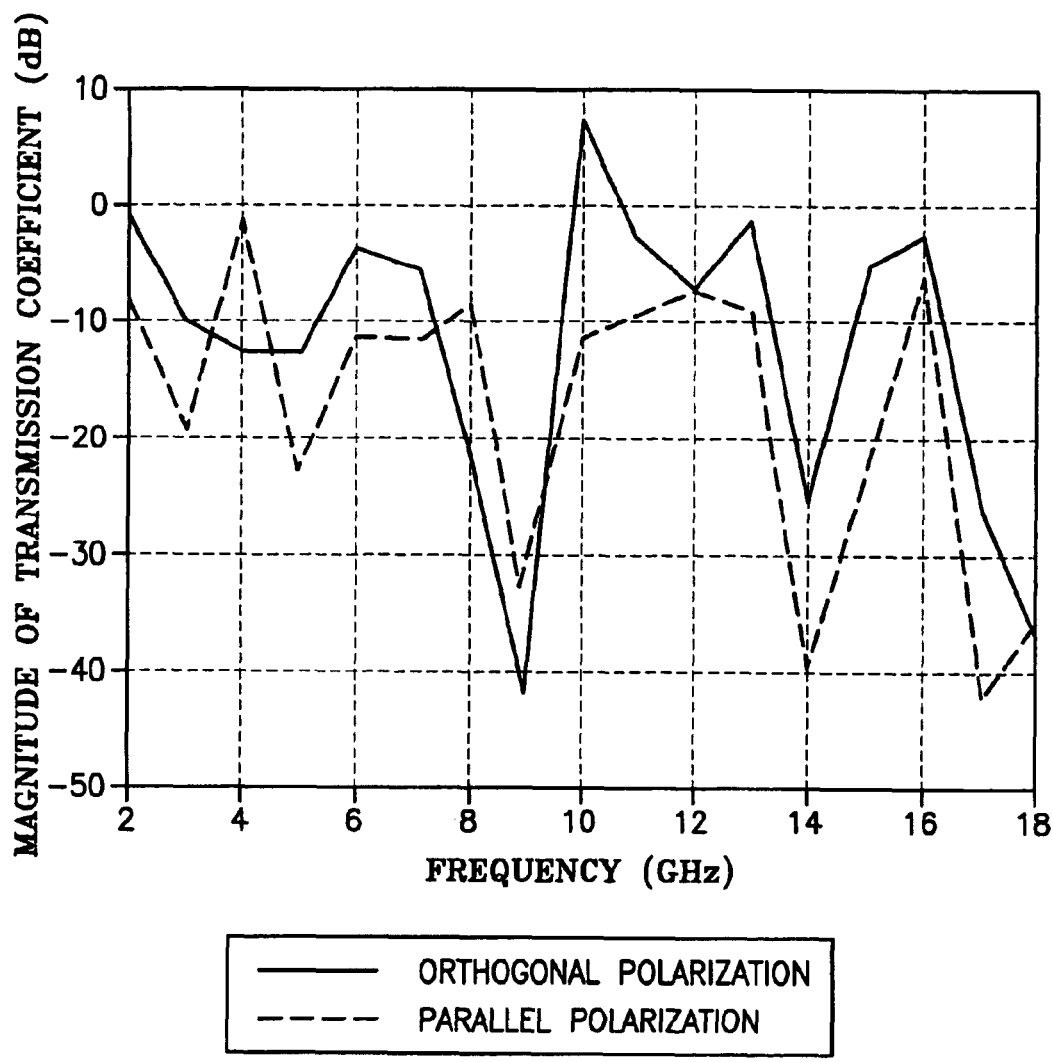
FIG. 15 is a plot of the transmission properties of an exemplary transmission region of the present invention over the 2 to 18 GHz frequency band.

The test results of another aperture having zigzag openings are shown in FIGS. 14 and 15. This aperture is also similar to FIG. 4, wherein: the length a was about 53.88 mm; the spacing b was about 2 mm; and the angle between the opening segments, i.e., legs, was about 70 degrees. As can be seen in the figures, this embodiment provides an improvement in the transmission performance for orthogonal polarization. There are nulls around 9 and 14 GHz, but overall the transmission characteristics are good.

Figure 16:
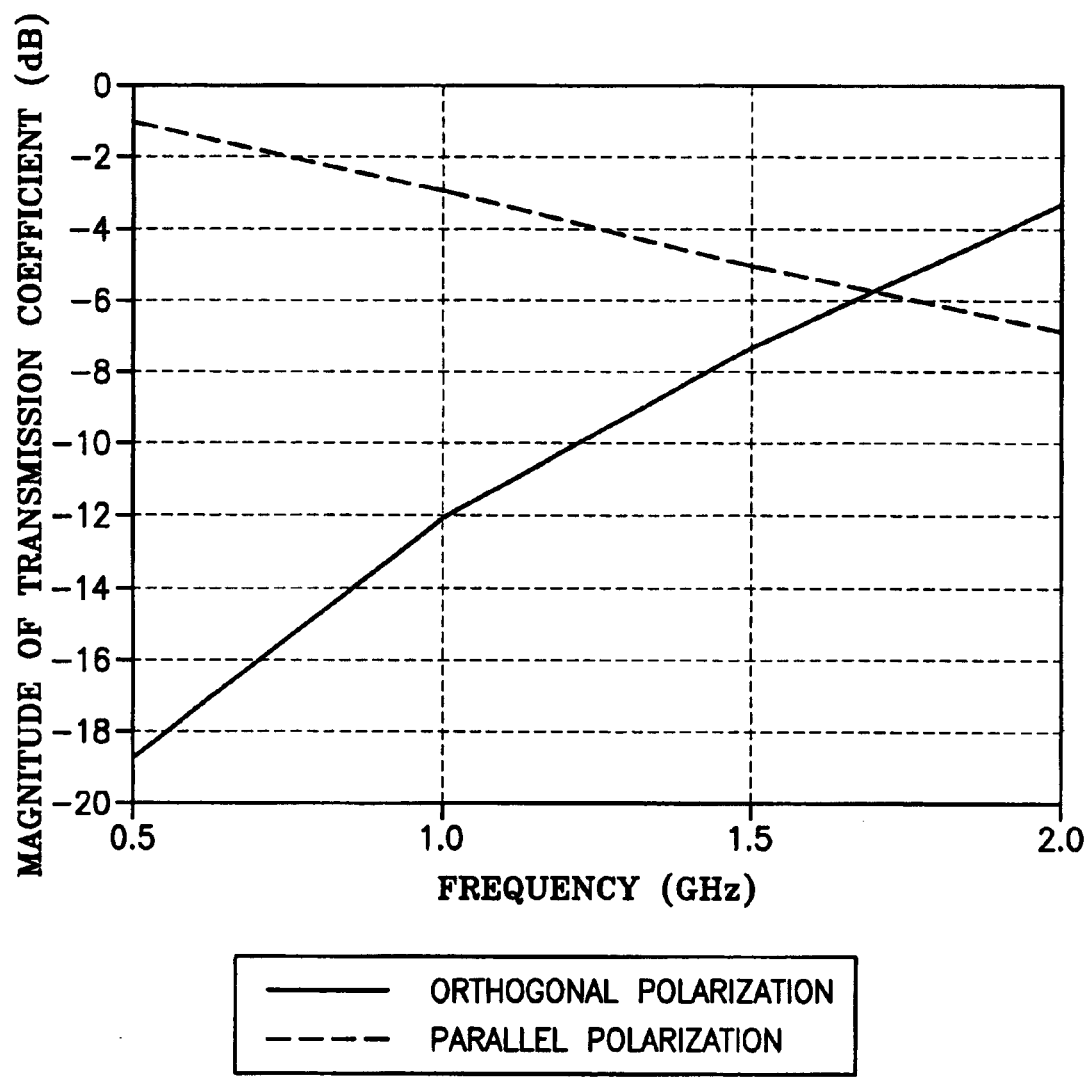
FIG. 16 is a plot of the transmission properties of an exemplary transmission region of the present invention over the 0.5 to 2 GHz frequency band.
Figure 17:
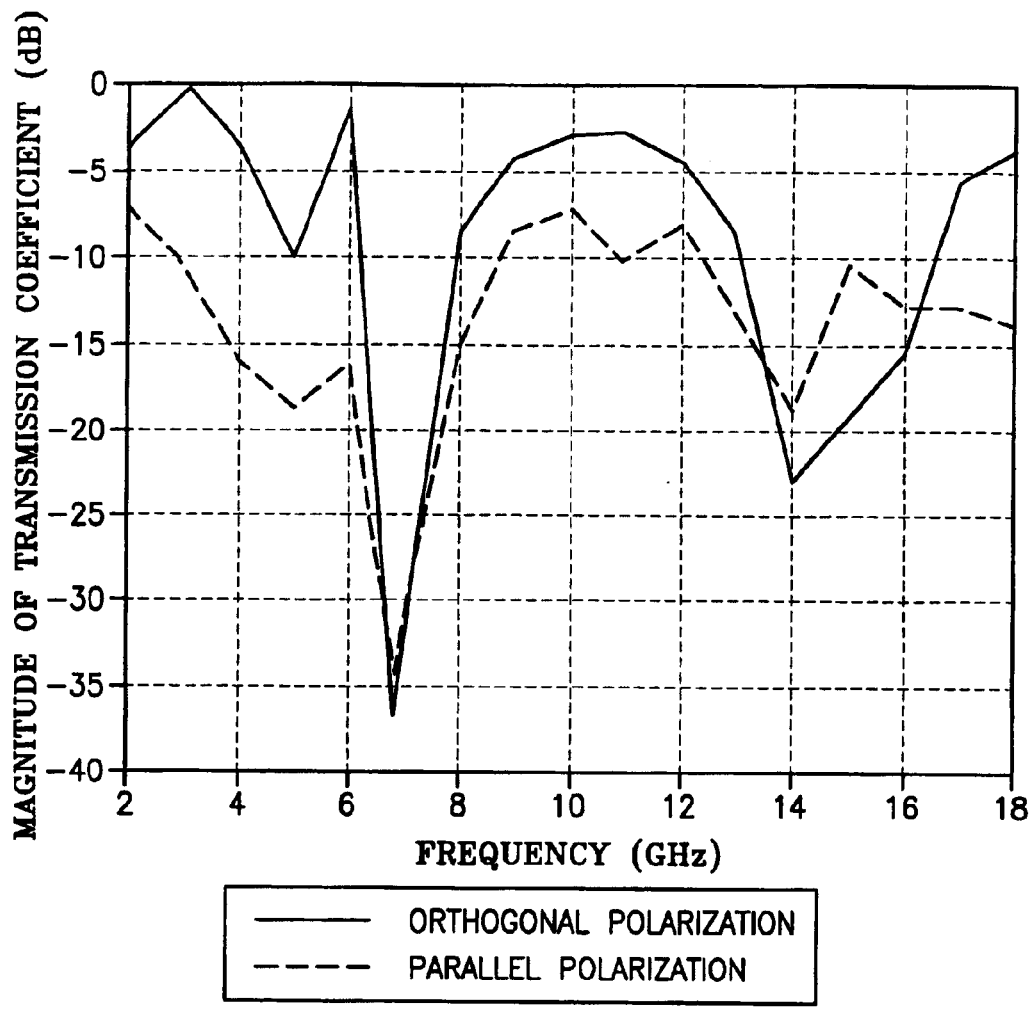
FIG. 17 is a plot of the transmission properties of an exemplary transmission region of the present invention over the 2 to 18 GHz frequency band.

FIGS. 16 and 17 show the transmission characteristics of still another aperture in the 0.5 to 2 GHz and the 2 to 18 GHz frequency bands, respectively. In this example, the aperture was similar to the embodiment shown in FIG. 4. The aperture had a length a of about 35.92 mm and a spacing b of about 2 mm. The angle between the opening segments, i.e., legs, was about 70 degrees. In light of FIG. 16 and the previous test results, it is evident that breaking the legs has a significant effect on the transmission coefficient in the 0.5 to 2 GHz frequency range. FIG. 17 shows nulls around 7 and 14 GHz, but the response around the 10 GHz frequency region is good for both vertical and horizontal polarizations.

Figure 18:
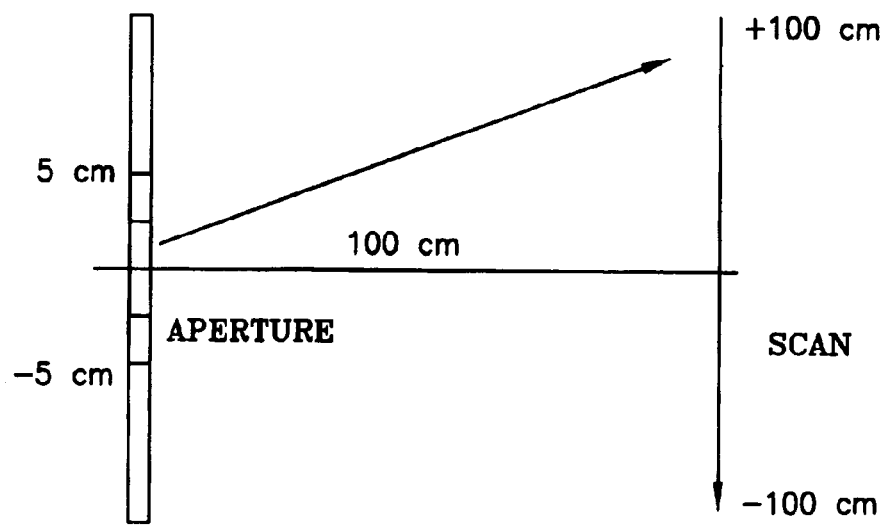
FIG. 18 is a diagram used to demonstrate the effect of one exemplary tapered aperture of the present invention.

FIG. 18 is a diagram used to demonstrate the effect of a tapered aperture. The tapered aperture had a width of about 10 cm. The transmission properties were simulated one meter from the tapered aperture.

Figure 19:
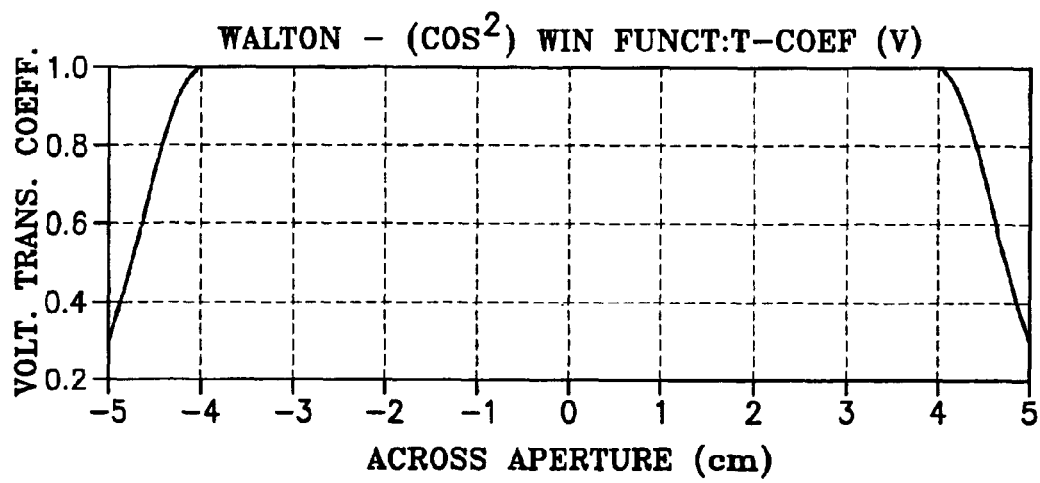
FIG. 19 is a plot of the transmission coefficient versus distance across the aperture shown in FIG. 18 of one embodiment of an abruptly tapered aperture of the present invention.
Figure 20:
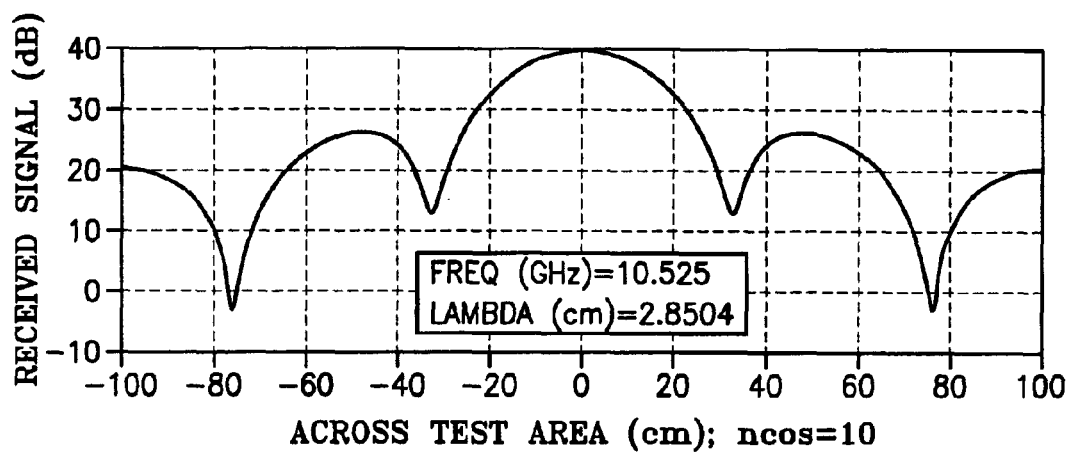
FIG. 20 is a plot of the signal level as a function of position along the scan line shown in FIG. 18 one meter away from the embodiment of the tapered aperture shown in FIG. 19.

In FIGS. 19 and 20, the lobing pattern one meter from a sharp edge (20% coverage cosine-on-a-pedestal) aperture is shown. In other words, the cosine tapering only effects 10% of the aperture at the left edge and the right edge (for a total of 20%). As a result, the lobing pattern in this example is about −13 dB with respect to the main lobe.

Figure 21:
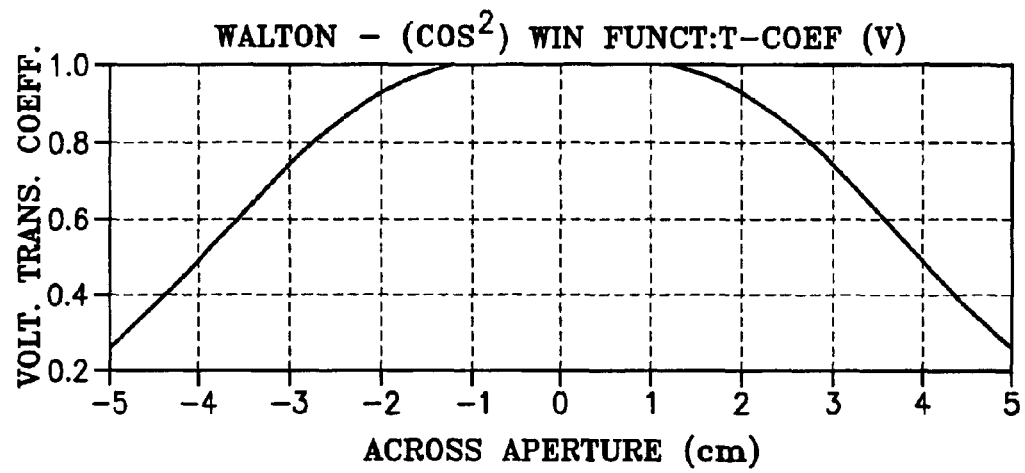
FIG. 21 is a plot of the transmission coefficient of one embodiment of a smoothly tapered aperture of the present invention.
Figure 22:
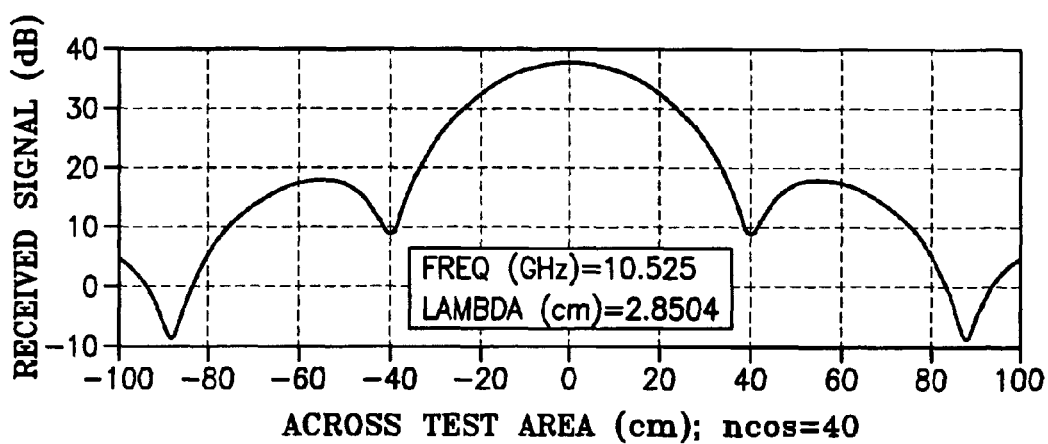
FIG. 22 is a plot of the signal level as a function of position along the scan line shown in FIG. 18 one meter away from the embodiment of the tapered aperture shown in FIG. 21.

On the other hand, FIGS. 21 and 22 show the cross aperture transmission coefficient and the resulting signal level as a function of position one meter away from another embodiment of a tapered aperture. In this example, an 80% coverage cosine-on-a-pedestal aperture (i.e., the cosine tapering effects the left and right 40% for a total of 80%) was tested. This embodiment reduced the side lobe to −22 dB with respect to the main lobe. Consequently, these examples show that the use of tapering significantly reduces the lobing effect.

The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. A panel comprising:
   a metal layer in electrical communication with a source of electricity; and
   an aperture in said metal layer comprising a plurality of openings arranged in a pattern such that said openings are approximately parallel to each other and the respective lengths of said openings generally increase from one side of said pattern to an opposite side of said pattern, said aperture oriented such that electricity is adapted to pass between said openings from a first portion of said metal layer to a second portion of said metal layer;
   wherein said aperture is adapted to enable the transmission of a radio frequency signal through said metal layer.

2. The panel of claim 1 wherein said openings are slots.

3. The panel of claim 1 wherein said openings are zigzags.

4. The panel of claim 3 wherein at least one of said zigzags is broken.

5. The panel of claim 3 further comprising a plurality of fill-in openings along opposing edges of said zigzags.

6. The panel of claim 1 further comprising:
   a first bus in electrical communication with said source of electricity and said first portion of said metal layer; and
   a second bus in electrical communication with said second portion of said metal layer,
   wherein said aperture is oriented such that electricity is adapted to pass between said openings from said first bus to said second bus.

7. A window comprising:
   a sheet of dielectric material;
   a metal layer traversing said dielectric material; and
   an aperture in said metal layer, said aperture comprising a plurality of openings arranged in a pattern such that said openings are approximately parallel to each other and the respective lengths of said openings generally increase from one side of said pattern to an opposite side of said pattern.

8. The window of claim 7 herein said window is a vehicle window.

9. The window of claim 7 wherein said dielectric material is glass.

10. The window of claim 7 wherein:
    said dielectric material is comprised of a plurality of layers; and
    said metal layer is secured between said layers of said dielectric material.

11. The window of claim 7 wherein said metal layer is vacuum deposited on said dielectric material.

12. The window of claim wherein said openings are slots.

13. The window of claim 7 wherein said openings are approximately vertically oriented.

14. The window of claim 7 wherein said openings are approximately horizontally oriented.

15. The window of claim 7 wherein said openings are zigzags.

16. The window of claim 15 wherein at least one of said zigzags is broken.

17. The window of claim 15 further comprising a plurality of fill-in openings along opposing edges of said zigzags.

18. The window of claim 7 further comprising:
    a first bus in electrical communication with a power source and said metal layer; and
    a second bus in electrical communication with said metal layer;
    wherein said aperture is oriented such that electricity is adapted to pass between said openings from said first bus to said second bus, and said aperture is adapted to enable the transmission of a radio frequency signal through said metal layer.

19. A panel comprising:
    a metal layer; and
    an aperture in said metal layer comprising a plurality of openings that are approximately parallel to each other, said openings including a plurality of zigzag openings, said openings further including a fill-in opening along an edge of said aperture such that said fill-in opening is not a leg of an adjacent one of said zigzag openings.

20. The panel of claim 19 wherein said fill-in opening is a substantially straight slot.

21. The panel of claim 19 wherein said fill-in opening is a zigzag consisting essentially of a first leg and a second leg.

22. The panel of claim 19 wherein:
    said openings include at least one additional fill-in opening along an edge of said aperture such that said at least one additional fill-in opening is not a leg of an adjacent on of said zigzag openings; and
    said fill-in openings are selected from the group consisting of substantially straight slots and zigzags consisting essentially of a first leg and a second leg.

23. The panel of claim 19 wherein said fill-in opening is situated substantially within an imaginary outer boundary of said aperture as defined by said adjacent zigzag opening.

24. The panel of claim 19 wherein said fill-in opening does not extend in a direction substantially beyond said adjacent zigzag opening.

25. The panel of claim 19 further comprising:
    a first bus in electrical communication with a power source and said metal layer; and
    a second bus in electrical communication with said metal layer such that current is adapted to pass between said openings from said first bus to said second bus;
    wherein said fill-in aperture is adapted to direct current inside an edge of said aperture.

* * * * *

UNITED STATES PATENT AND TRADEMARK OFFICE
CERTIFICATE OF CORRECTION

PATENT NO. : 6,922,175 B2
DATED : July 26, 2005
INVENTOR(S) : Walton

It is certified that error appears in the above-identified patent and that said Letters Patent is hereby corrected as shown below:

Column 9,
Line 55, please delete "12. The window of claim wherein said openings are slots" and insert -- 12. The window of claim 7, wherein said openings are slots --.

Column 10,
Line 38, please delete "on of said zigzag openings; and" and insert -- one of said zigzag openings; and --.

Signed and Sealed this

Eighteenth Day of October, 2005

JON W. DUDAS
*Director of the United States Patent and Trademark Office*